(12) United States Patent
Oshinubi et al.

(10) Patent No.: US 9,958,297 B2
(45) Date of Patent: May 1, 2018

(54) SENSOR DEVICE FOR ASCERTAINING AT LEAST ONE ROTATION CHARACTERISTIC OF A ROTATING ELEMENT

(71) Applicant: Robert Bosch GmbH, Stuttgart (DE)

(72) Inventors: Dayo Oshinubi, Rutesheim (DE); Stefan Leidich, Rutesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days. days.

(21) Appl. No.: 15/414,686

(22) Filed: Jan. 25, 2017

(65) Prior Publication Data
US 2017/0227379 A1    Aug. 10, 2017

(30) Foreign Application Priority Data

Feb. 8, 2016   (DE) ........................ 10 2016 201 851

(51) Int. Cl.
   *G01D 5/20*    (2006.01)
   *F01L 1/047*   (2006.01)
   *F01L 1/34*    (2006.01)

(52) U.S. Cl.
   CPC ............... *G01D 5/204* (2013.01); *F01L 1/047* (2013.01); *F01L 1/34* (2013.01); *G01D 5/2046* (2013.01); *F01L 2820/041* (2013.01)

(58) Field of Classification Search
   CPC ............. F01L 1/34; F01L 1/344; F01L 1/352
   See application file for complete search history.

(56) References Cited

U.S. PATENT DOCUMENTS

| | | | |
|---|---|---|---|
| 6,611,138 B2 | 8/2003 | Vasiloiu | |
| 7,499,878 B2 | 3/2009 | Janakiraman et al. | |
| 9,316,126 B2 | 4/2016 | Baumann et al. | |
| 2007/0261670 A1* | 11/2007 | Nguyen | F01L 1/3442 |
| | | | 123/406.59 |

(Continued)

FOREIGN PATENT DOCUMENTS

| | | |
|---|---|---|
| AT | 509101 A1 | 6/2011 |
| DE | 102012203539 A1 | 9/2012 |
| DE | 102012213539 A1 | 2/2014 |

OTHER PUBLICATIONS

Konrad Reif, "Sensoren im Kraftfahrzeug [Automotive Sensors]", 2nd edition, 2012, p. 63-74 and 120-129.

*Primary Examiner* — Jermele M Hollington
*Assistant Examiner* — Alvaro Fortich
(74) *Attorney, Agent, or Firm* — Norton Rose Fulbright US LLP; Gerard Messina

(57) ABSTRACT

A sensor device for ascertaining at least one rotation characteristic of a rotating element is provided. The sensor device includes at least one trigger wheel which is able to be connected to the rotating element. The rotating element and the trigger wheel have an axis of rotation. The sensor device includes at least one coil array. The coil array encompasses at least one excitation coil and at least one receiver coil. The coil array is situated on at least one circuit carrier. The trigger wheel as a trigger wheel profile. The sensor device is designed to ascertain a change in an inductive coupling between the excitation coil and the receiver coil as a function of a position of the trigger wheel. The circuit carrier is situated coaxially with the axis of rotation of the trigger wheel. The circuit carrier surrounds the trigger wheel at least partially in a circular manner.

12 Claims, 5 Drawing Sheets

(56) References Cited

U.S. PATENT DOCUMENTS

2009/0276145 A1* 11/2009 Schafer .................. F01L 1/024
 701/105
2013/0057263 A1 3/2013 Hosek
2013/0068180 A1* 3/2013 Heywood ............... F01L 1/344
 123/90.11

* cited by examiner

SENSOR DEVICE FOR ASCERTAINING AT LEAST ONE ROTATION CHARACTERISTIC OF A ROTATING ELEMENT

CROSS REFERENCE

The present application claims the benefit under 35 U.S.C. § 119 of German Patent Application No. DE 102016201851.5 filed on Feb. 8, 2016, which is expressly incorporated herein by reference in its entirety.

BACKGROUND INFORMATION

Conventional sensors often sense at least one rotation characteristic of rotating elements. Rotating characteristics generally describe characteristics that at least partially describe the rotation of the rotating element. For instance, this may involve angular velocities, rotary frequencies, angular accelerations, angles of rotation, angular position or other characteristics which may characterize a continuous or discontinuous, regular or irregular rotation or revolution of the rotating element. Examples of such sensors are described in Konrad Reif (Publ.): Sensoren im Kraftfahrzeug [Automotive Sensors], $2^{nd}$ edition, 2012, pages 63-74 and 120-129.

For instance, a position of a camshaft of an internal combustion engine relative to a crankshaft can be ascertained with the aid of what is generally referred to as a phase sensor employing a Hall-effect sensor. Typically, a trigger wheel is mounted on the rotating axis. Teeth may be situated on the trigger wheel which are sampled by the Hall-effect sensor when the camshaft is rotating. In German Patent Application No. DE 10 2012 213 539 A1, for instance, a method is described for ascertaining a phase position of an adjustable camshaft of an internal combustion engine which includes a trigger wheel and a camshaft adjuster. The phase position of the camshaft is ascertained on the basis of phase flank interrupts triggered by the trigger wheel, and a model that is a function of at least one operating variable of the camshaft adjuster.

However, methods of this kind do not allow continuous position sensing. Absolute angle sensing in a measuring range of 360° is not possible. Also, the resolution is limited due to the small diameters of the used trigger wheels. These small diameters result in minimal gap sizes that must be taken into account. In addition, an absolute position determination is possible only in a dynamic case, when the trigger wheel is rotating. An instantaneous availability of the absolute positional value when switching on the voltage supply, i.e. a true power-on function, is therefore not provided. Especially in a startup of an engine of the internal combustion engine, a precise position is not known. Apart from that, such methods are highly sensitive with regard to magnetic interference fields.

U.S. Pat. No. 7,499,878 B2 describes an inductive linear and rotary position sensor. A device having an excitation coil and a receiver coil is described. The excitation coil is excited by an excitation source and generates a magnetic flux. The receiver coil generates a receive signal through an inductive coupling between the excitation coil and the receiver coil.

Despite the improvements brought about by such sensor devices, there is still room for improvement. Sensor devices of this type may have a complex structure, which particularly means that a simple installation and de-installation are not possible.

SUMMARY

Therefore, a sensor device and a method for ascertaining at least one rotation characteristic of a rotating element are provided, which may avoid the aforementioned problems of conventional devices and methods at least for the most part; in particular, they allow for high-resolution sensing of a rotation characteristic, especially an absolute angle, of a rotating element in a measuring range of 360°, and are represented in the claims.

In a first aspect of the present invention, a sensor device for ascertaining at least one rotation characteristic of a rotating element is proposed. In general, a rotation characteristic may be understood to refer to a characteristic that at least partially describes the rotation of the rotating element. This, for instance, may be angular velocities, rotary frequencies, angular accelerations, angles of rotation, angular positions or other characteristics, which are able to characterize a continuous or non-continuous, regular or irregular rotation or revolution of the rotating element. For instance, the rotation characteristic may be a position, especially an angular position. In principle, a rotating element may describe an arbitrary element which has an axis of rotation and rotates about said axis. The rotating element, for example, may be a shaft of a drive machine such as a camshaft. For instance, an angular position of a camshaft is able to be ascertained. An angular position of a camshaft may describe an angle of rotation of the camshaft in relation to an axis that is positioned at a right angle to the axis of rotation.

The sensor device includes at least one trigger wheel which is able to be connected to the rotating element. The rotating element and the trigger wheel have an axis of rotation, especially a shared axis of rotation. The trigger wheel may be situated concentrically about the rotating element and have a cylindrical basic form. The axis of rotation may be an axis of symmetry parallel to a height of the cylinder. The trigger wheel may be connected to the rotating element. The trigger wheel may be mounted on the rotating element, for instance with the aid of at least one fastening element. The trigger wheel may be fastened to the rotating element in a concentric manner. In response to a rotary motion of the rotating element, the trigger wheel is able to rotate along with the rotating element. A position, in particular an angular position, of the trigger wheel may correspond to a position of the rotating element, in particular an angular position.

The sensor device includes at least one coil array. In principle, a coil array may describe a device of arbitrary shape which includes at least one coil. A coil may be understood as a component that is set up to generate or detect a magnetic field. The coil array includes at least one excitation coil and at least one receiver coil. The excitation coil and the receiver coil may have at least one winding. For example, the excitation coil and the receiver coil may be developed as circuit traces made from metal, for instance. An excitation coil may be understood as a coil which generates a magnetic flux when excited. The excitation is able to be brought about by a source, in particular a current source. The coil array may include an excitation coil having at least one winding. The excitation coil and the receiver coil are able to be coupled in an inductive manner. A receiver coil may describe a coil which is set up to generate a signal as a result of the inductive coupling between excitation coil and receiver coil, the signal being a function of the inductive coupling. The inductive coupling may be dependent upon a position of the trigger wheel. The trigger wheel can be produced from a metal and during a rotary motion, may sweep a region of the coil array and change the inductive coupling between the excitation coil and receiver coil. The receiver coil may include at least one sensor coil. The receiver coil may be made up of two partial windings of a coil that are oriented in an opposite direction. This means that during a current flow through the coil, current is flowing through the partial windings in a clockwise direction and in a counter-clockwise direction respectively. The coil array may have a multiplicity of receiver coils such as a receiver coil system, in particular a sine/cosine system or a multiphase system. Other coil systems are conceivable as well in principle. The sensor device may be designed to represent a sine system, a cosine system or a multiphase system for the detection.

The coil array is situated on at least one circuit carrier. A circuit carrier may be understood to describe a device which is set up to accommodate electronic components. The circuit carrier may be a planar circuit carrier such as a circuit board, a circuit card, a wafer or a printed circuit, in particular a printed circuit board (PCB), and the coil array may be printed onto the PCB, for example.

The trigger wheel has a trigger-wheel profile. The trigger wheel may have a cylindrical basic shape. In principle, a trigger-wheel profile may be understood to describe an arbitrarily shaped development of a cylinder jacket of the trigger wheel. For instance, the cylinder jacket may have at least one bulge and/or at least one notch. The trigger wheel profile may include at least one profile element which can be a tooth, for instance. The profile element may be a track contoured in a width of the trigger wheel. A width of the trigger wheel may be understood as a height of the cylinder jacket. The trigger wheel may include a multiplicity of profile elements which may be distributed across a circumference of the trigger wheel, in particular. For example, the trigger wheel may have a plurality of teeth and/or at least one contoured track. The profile elements may be periodically disposed across the circumference of the trigger wheel. The profile elements are able to be disposed equidistantly across the circumference but other developments are also conceivable in principle, such as developments in which the profile elements are not situated equidistantly.

The sensor device is designed to ascertain a change in the inductive coupling between the excitation coil and the receiver coil as a function of a position of the trigger wheel. The sensor device may be set up for ascertaining an absolute position of the rotating element from the change in the inductive coupling. An ascertainment of an absolute position of the rotating element may describe an ascertainment of a position, in particular an angular position, relative to the sensor device. The inductive coupling may be dependent upon a position of the trigger wheel. During a rotary motion, the trigger wheel may sweep a region of the coil array, which may lead to a change in the magnetic flux and to a change in the inductive coupling between the excitation coil and receiver coil. The inductive coupling may change as a function of the trigger-wheel profile. For instance, the inductive coupling may change at a beginning of a profile element and/or at an end of a profile element. The receiver coil is able to generate a signal that is a function of the inductive coupling. The sensor device may be designed to provide an availability, in particular an instantaneous availability, of an absolute positional value of the rotating element when a voltage supply is switched on, for instance during a start of an engine of an internal combustion engine (true power-on function).

The sensor device may include an evaluation unit. The evaluation unit may include at least one evaluation circuit which can be situated together with the coil array on a shared circuit carrier, or which may be disposed separately from the coil array on a further circuit carrier. The evaluation unit may include a data-processing device and be designed to receive the signal from the receiver coil and to ascertain a position of the trigger wheel, in particular an angular position.

The circuit carrier is situated coaxially with the axis of rotation of the trigger wheel. "Situated coaxially with the axis of rotation of the trigger wheel" may be understood to mean that that the circuit carrier is situated on a cylinder jacket around the trigger wheel, in a radial position relative to the camshaft. The circuit carrier surrounds the trigger wheel at least partially in a circular manner. "At least partially in a circular manner" may be understood to mean that the circuit carrier does not surround the trigger wheel completely but covers a subregion, in particular a circle segment of the trigger wheel. For example, the circuit carrier may have an opening angle. The circuit carrier may cover a subsection of the circumference of the trigger wheel according to the opening angle. An absolute measuring range of the sensor device may depend on the opening angle of the circuit carrier. This system is particularly advantageous from the aspect of an installation and de-installation of the sensor device. In principle, other developments are conceivable as well such as developments in which the circuit carrier surrounds the trigger wheel completely.

The circuit carrier may include a multiplicity of coil arrays. For instance, the circuit carrier may have a first region in which a first coil array is situated, and a second region in which a second coil array is disposed.

The circuit carrier may have a flexible design. For example, the circuit carrier may be a planar circuit carrier which is developed to be flexible, especially bendable. The circuit carrier may include a flexible material and, for instance, be a flexible circuit board. The circuit carrier, for example, may be a rigid-flex circuit board, particularly a bent rigid-flex circuit board. The circuit carrier may have at least two planar surfaces, and the planar surfaces may be situated at an angle with respect to one another. The circuit carrier may be a rigid circuit carrier. The circuit carrier may have at least one connection element, such as a material preweakening and/or a notch, which is designed to connect the planar surfaces to each other.

The circuit carrier may be situated in an injection-molded housing. For the mechanical stabilization, the circuit carrier, which includes a sensor wafer and an evaluation unit, for example, can be situated in an injection-molded housing.

The sensor device may have at least two trigger wheels. In addition, the sensor device can have at least two coil arrays; a first coil array may be situated coaxially with a first trigger wheel, and a second coil array may be situated coaxially with a second trigger wheel. For instance, the two coil arrays, e.g., a first coil array and a second coil array, are able to be placed on a shared circuit carrier. The first coil array may include a multiplicity of receiver coils such as a first receiver-coil array. The second coil array may include a multiplicity of receiver coils such as a second receiver-coil array.

The first trigger wheel and the second trigger wheel are able to have trigger wheel profiles that differ from one another. For example, the first trigger wheel may have a trigger wheel profile in which profile elements having a first periodicity are situated on the first trigger wheel. The second trigger wheel may have a trigger wheel profile in which profile elements having a second periodicity that differs from the first periodicity are situated. The first trigger wheel and the second trigger wheel are able to have identical trigger wheel profiles and be situated at an offset from one another. The first trigger wheel and the second trigger wheel may be connected to one another; for example, the first trigger wheel and the second trigger wheel may be designed as one part. An evaluation and position determination is able to take place with the aid of a Vernier (Nonius) method in which in particular an interpolation of a multiplicity of signals to a measuring value takes place, especially a positional value. In this way the measuring range of the sensor device is able to be expanded to a measuring range of 360° through the use of two trigger wheels or two trigger wheel profiles that differ in their periodicity, and two coil arrays.

In one further aspect of the present invention, a method for ascertaining at least one rotation characteristic of a rotating element is proposed. With regard to definitions and specific embodiments of the method, reference can be made to the above comments with regard to the sensor device proposed in a first aspect of the present invention. A sensor device according to the present invention is used in the method. The sensor device includes at least one trigger wheel which is able to be connected to the rotating element. The rotating element and the trigger wheel have an axis of rotation. The sensor device includes at least one coil array, which encompasses at least one excitation coil and at least one receiver coil. The coil array is situated on at least one circuit carrier. The trigger wheel has a trigger wheel profile. In the method, a change of an inductive coupling between the excitation coil and the receiver coil is ascertained as a function of a position of the trigger wheel. The circuit carrier is situated coaxially with the axis of rotation of the trigger wheel. The circuit carrier surrounds the trigger wheel at least partially in a circular manner. An absolute position of the rotating element is able to be ascertained from the change in the inductive coupling. The method may allow for an instantaneous availability of an absolute positional value when a voltage supply is switched on (true power-on function).

BRIEF DESCRIPTION OF THE DRAWINGS

Additional optional details and features of the present invention result from the following description of preferred exemplary embodiments which are schematically shown in the figures.

DETAILED DESCRIPTION OF EXAMPLE EMBODIMENTS

Figure 1:
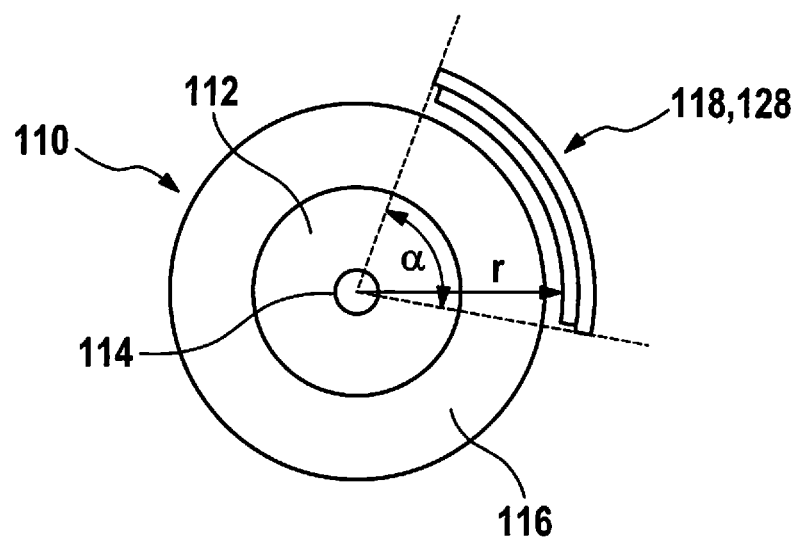
FIG. 1 shows a schematic representation of an exemplary embodiment of a sensor device according to the present invention.

FIG. 1 shows a schematic representation of an exemplary embodiment of a sensor device 110 for ascertaining at least one rotation characteristic of a rotating element 112 according to the present invention. For example, sensor device 110 may be set up for ascertaining an angular position of rotating element 112. Rotating element 112 may have an axis of rotation 114, which extends into the drawing plane in FIG. 1. For instance, rotating element 112 may be a shaft in a drive machine such as a camshaft. An angular position of a camshaft, for example, is able to be ascertained.

Sensor device 110 includes at least one trigger wheel 116 which is able to be connected to rotating element 112. Rotating element 112 and trigger wheel 116 have an axis of rotation such as a shared axis of rotation 114. Trigger wheel 116 may be situated concentrically around rotating element 112 and have a cylindrical basic shape. Trigger wheel 116 is able to be connected to rotating element 112. During a rotary motion of rotating element 112, trigger wheel 116 is able to rotate together with rotating element 112 so that a position, in particular an angular position, of trigger wheel 116 corresponds to a position of rotating element 112, in particular an angular position.

Figure 2:
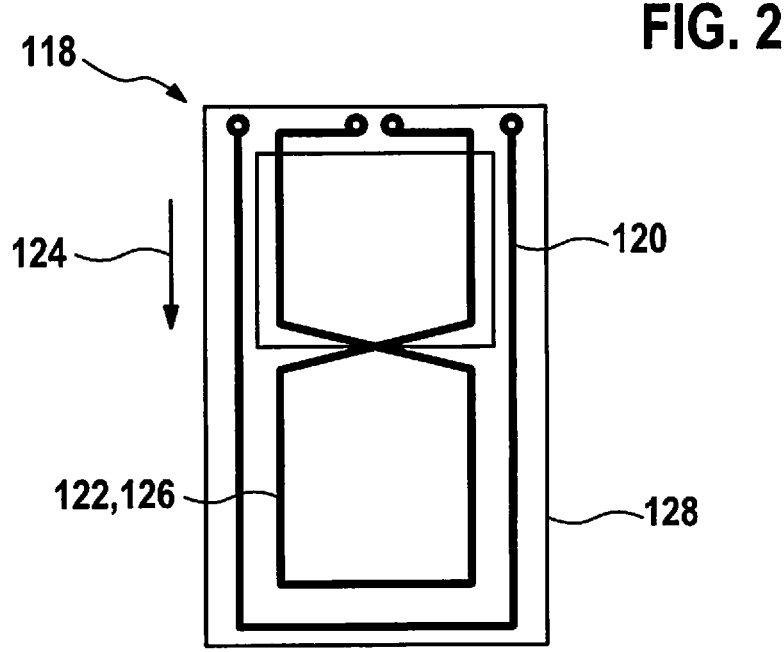
FIG. 2 shows a schematic representation of a coil array according to the present invention.

Sensor device 110 includes at least one coil array 118. A schematic representation of a coil array 118 according to the present invention is shown in FIG. 2. Coil array 118 includes at least one excitation coil 120 and at least one receiver coil 122. Excitation coil 120 and receiver coil 122 may have at least one winding. Excitation coil 120 and/or receiver coil 122, for example, may be developed as a circuit trace made of a metal, for instance. In response to an excitation, e.g., by a source, in particular a current source, excitation coil 120 is able to generate a magnetic flux. Excitation coil 120 and receiver coil 122 may be inductively coupled. On account of the inductive coupling between excitation coil and receiver coil, receiver coil 122 is able to generate a signal which is a function of the inductive coupling. The inductive coupling may depend on a position of trigger wheel 116. Trigger wheel 116 may be produced from a metal. The motion of trigger wheel 116 is indicated by arrow 124 in FIG. 2. In response to a rotary motion, trigger wheel 116 is able to sweep a region of coil array 118 and modify the inductive coupling between excitation coil 120 and receiver coil 122. The receiver coil may have at least one sensor coil 126. FIG. 2 shows a specific embodiment in which receiver coil 122 includes a sensor coil 126. The latter may be made up of two partial windings of a coil which are oriented in an opposite direction. In response to a current flow through sensor coil 126, current may flow through the partial windings in a clockwise direction and in a counter-clockwise direction respectively. Coil array 118 may have a multiplicity of receiver coils 122, and sensor device 110 may be designed to represent a sine system, a cosine system or a multi-phase system for detection. Coil array 118 is disposed on at least one circuit carrier 128. The circuit carrier may be a planar circuit carrier, such as a circuit board, a circuit card, a wafer or a printed circuit, especially a printed circuit board (PCB). For instance, coil array 118 may be printed onto the PCB.

Circuit carrier 128 is disposed coaxially with axis of rotation 114 of trigger wheel 116. As shown in FIG. 1, circuit carrier 128 may be situated on a cylinder jacket having radius r around trigger wheel 116, in a radial placement with respect to the camshaft. Circuit carrier 128 surrounds trigger wheel 116 at least partially in a circular manner. Circuit carrier 128 may cover a subregion, in particular a circle segment of trigger wheel 116. For instance, circuit carrier 128 may have an opening angle α. Circuit carrier 128 may cover a subsection of a circumference of trigger wheel 116 according to opening angle α. An absolute measuring range of sensor device 110 may be a function of opening angle α of circuit carrier 128.

Figure 3A:
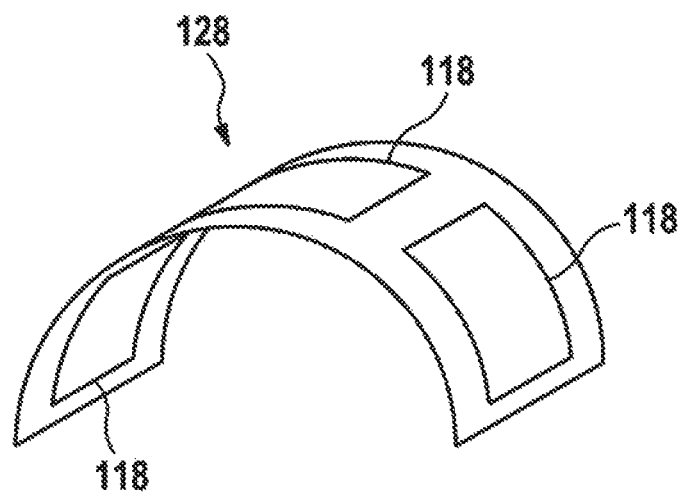
FIG. 3A shows an exemplary embodiment in which circuit carrier has a flexible design.
Figure 3B:
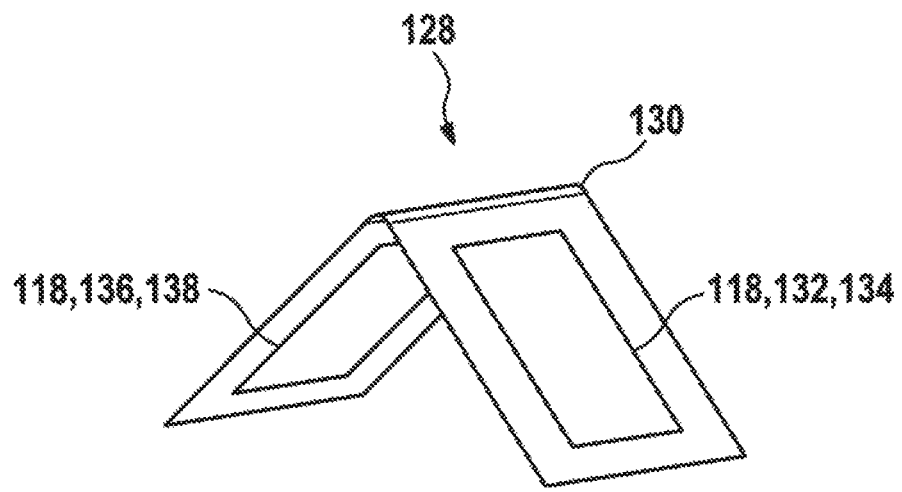
FIG. 3B shows an exemplary embodiment in which circuit carrier has two planar areas which may be situated at an angle with respect to one another.

Circuit carrier 128 may include a multiplicity of coil arrays 118. FIGS. 3A and 3B show a respective schematic representation of a circuit carrier 128 according to the present invention.

FIG. 3A shows an exemplary embodiment in which circuit carrier 128 has a flexible design. For example, circuit carrier 128 may be a planar circuit carrier which is developed to be flexible, and in particular bendable. Circuit carrier 128 may include a flexible material. For instance, circuit carrier 128 may be a flexible circuit board. Circuit carrier 128, for example, may be a rigid-flex circuit board, in particular a bent rigid-flex circuit board.

FIG. 3B shows an exemplary embodiment in which circuit carrier 128 has two planar areas which may be situated at an angle with respect to one another. Circuit carrier 128 may be a rigid circuit carrier and have at least one connection element 130, such as a material preweakening and/or notch, which are/is designed to connect the planar areas to one another. For instance, circuit carrier 128 may have a first region 132 in which a first coil array 134 is situated, and a second region 136 in which a second coil array 138 is disposed.

Circuit carrier 128 may be situated in an injection-molded housing. For the mechanical stabilization, the circuit carrier, which includes a sensor wafer and an evaluation unit, for example, may be disposed inside an injection-molded housing.

Figure 4A:
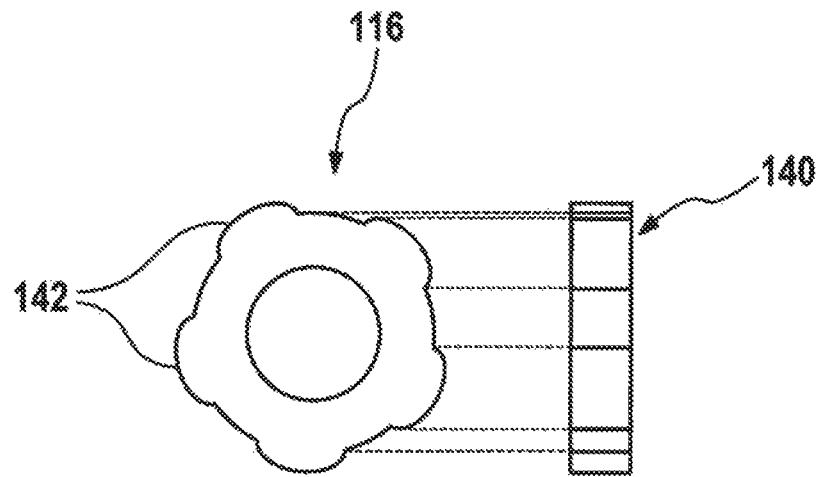
FIG. 4A shows a schematic representation of an exemplary embodiment of a trigger wheel having a trigger wheel profile according to the present invention.
Figure 4B:
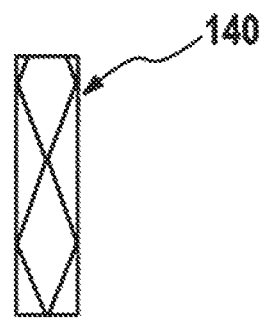
FIG. 4B shows a schematic representation of an exemplary embodiment of a trigger wheel having another trigger wheel profile.

Trigger wheel 116 has a trigger wheel profile 140. FIG. 4A shows a schematic representation of a trigger wheel 116 according to the present invention having a trigger wheel profile 140. Another exemplary embodiment of a trigger wheel profile 140 is shown in FIG. 4B. Trigger wheel 116 may have a cylindrical basic shape. A cylinder jacket of trigger wheel 116 may have at least one recess and/or at least one notch. Trigger wheel profile 140 may include at least one profile element 142. For instance, profile element 142 may be a tooth. Profile element 142 may be a track contoured according to a width of trigger wheel 116. Trigger wheel 116 may have a multiplicity of profile elements 142 which may be situated in distributed fashion along a circumference of trigger wheel 116, in particular. For instance, trigger wheel 116 may have a plurality of teeth and/or at least one contoured track. Profile elements 142 may be periodically distributed across the circumference of trigger wheel 116. Profile elements 142 may be distributed across the circumference spaced in an equidistant manner.

Sensor device 110 is designed to ascertain a change in the inductive coupling between excitation coil 120 and receiver coil 122 as a function of a position of trigger wheel 160. Sensor device 110 may be developed to determine an absolute position of rotating element 112 from the change in the inductive coupling. The inductive coupling may be a function of a position of trigger wheel 116. During a rotary motion, trigger wheel 116 may sweep a region of coil array 118. This may lead to a change in the magnetic flux and to a change in the inductive coupling between excitation coil 120 and receiver coil 122. The inductive coupling may change as a function of trigger wheel profile 140. For instance, the inductive coupling may change at a beginning of a profile element 142 and/or at an end of a profile element 142. Receiver coil 122 may generate a signal which is a function of the inductive coupling. Such a development of sensor device 110 may enable an availability of an absolute positional value when a voltage supply is switched on (true power-on function).

Sensor device 110 may have an evaluation unit. The evaluation unit may include at least one evaluation circuit which may be situated together with coil array 118 on a shared circuit carrier 128, or may be situated separately from coil array 118 on a further circuit carrier 128. The evaluation unit may encompass a data processing device. The evaluation unit may be designed to receive the signal from receiver coil 122 and to ascertain a position of trigger wheel 116, in particular an angular position.

Figure 5A:
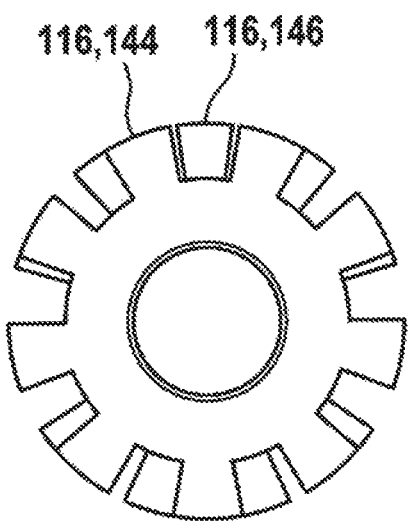
FIG. 5A shows exemplary embodiment of the sensor device according to the present invention having a first trigger wheel and a second trigger wheel, in a plan view.
Figure 5B:
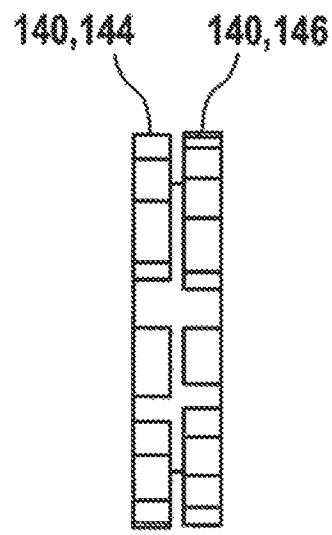
FIG. 5B shows a frontal view of the exemplary embodiment of the sensor device according to the present invention having a first trigger wheel and a second trigger wheel.
Figure 5C:
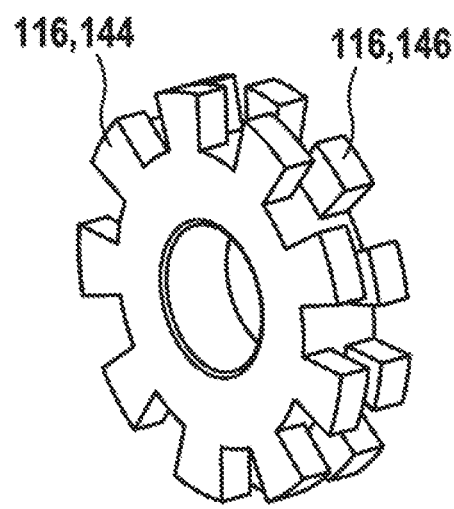
FIG. 5C shows a prospective view of the exemplary embodiment of the sensor device according to the present invention having a first trigger wheel and a second trigger wheel.
Figure 6A:
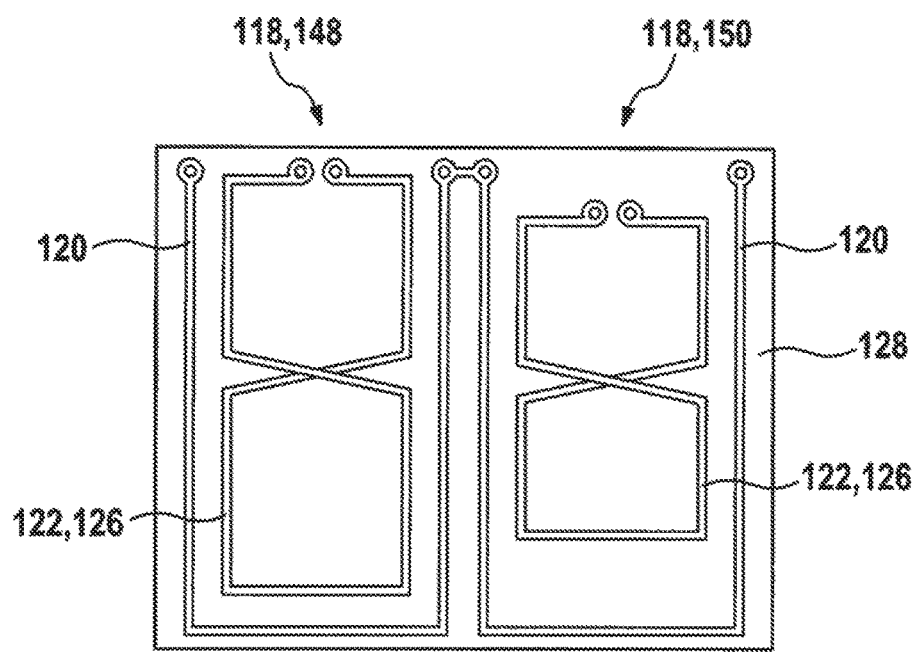
FIG. 6A shows a specific embodiment of a circuit carrier in which first coil array and second coil array respectively include an excitation coil and a receiver coil with a sensor coil.
Figure 6B:
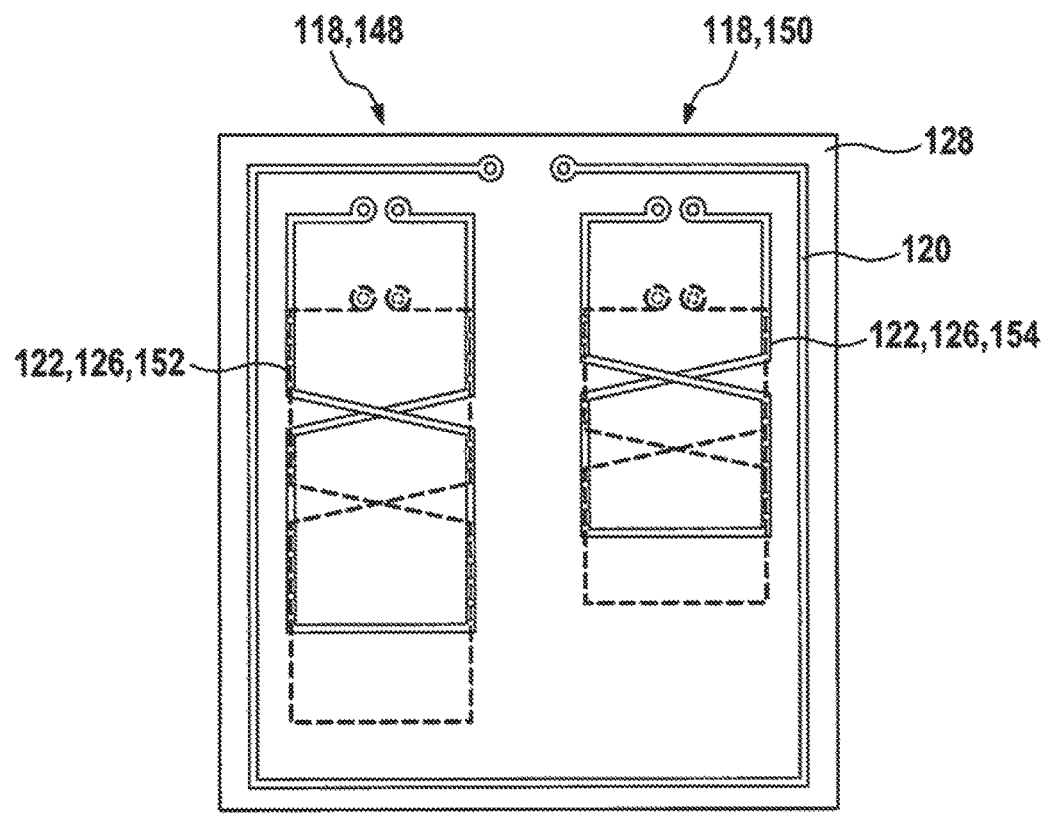
FIG. 6B shows a specific embodiment of a circuit carrier in which first coil array and second coil array have a shared excitation coil.

Sensor device 110 may have at least two trigger wheels 116. For instance, sensor device 110 may have a first trigger wheel 144 and a second trigger wheel 146. FIG. 5A shows a plan view of a system of first trigger wheel 144 and second trigger wheel 146, the axis of rotation 114 pointing into the drawing plane. FIG. 5B shows a frontal view of the respective trigger wheel profile 140. FIG. 5C shows a perspective view of this exemplary embodiment. First trigger wheel 144 and second trigger wheel 146 may have trigger wheel profiles that differ from one another. For example, the first trigger wheel may have a trigger wheel profile in which profile elements having a first periodicity are situated on the first trigger wheel. The second trigger wheel may have a trigger wheel profile in which profile elements having a second periodicity that differs from the first periodicity are situated. First trigger wheel 144 and second trigger wheel 146 may have identical trigger wheel profiles and be placed at an offset from one another. First trigger wheel 144 and second trigger wheel 146 may be connected to one another; for example, first trigger wheel 14 4 and second trigger wheel 146 are able to be developed as one part. In addition, sensor device 110 may have at least two coil arrays 118. For instance, the two coil arrays may be situated on a shared circuit carrier 128. A first coil array 148, for example, may be situated coaxially with first trigger wheel 144, and a second coil array 150 may be situated coaxially with a second trigger wheel 14 6. FIGS. 6A and 6B show a respective specific embodiment of a circuit carrier 128 on which first coil array 148 and second coil array 150 are situated. FIG. 6A shows a specific embodiment in which first coil array 148 and second coil array 150 respectively include an excitation coil 120 and a receiver coil 122 with sensor coil 126. FIG. 6B shows a specific embodiment in which first coil array 148 and second coil array 150 have a shared excitation coil 120. First coil array 148 may include a multiplicity of receiver coils 122, e.g., a first receiver coil system 152, in particular a sine/cosine system. Second coil array 150 may encompass a multiplicity of receiver coils 122, e.g., a second receiver coil system 154, in particular a sine/cosine system. An evaluation and a position ascertainment may take place with the aid of a Vernier (Nonius) method in which an interpolation of a multiplicity of signals into a measured value, especially a positional value, is performed, in particular. In this way the measuring range of sensor device 110 is able to be expanded to a measuring range of 360° through the use of two trigger wheels 116 or two trigger wheel profiles 140 that differ in the periodicity, and two coil arrays 118.

What is claimed is:

1. A sensor device for ascertaining at least one rotation characteristic of a rotating element, the sensor device comprising:
   at least one trigger wheel which is able to be connected to the rotating element, the rotating element and the trigger wheel having an axis of rotation; and
   at least one coil array including at least one excitation coil and at least one receiver coil, the coil array being situated on at least one circuit carrier, the trigger wheel having a trigger wheel profile, and the sensor device being designed to ascertain a change in an inductive coupling between the excitation coil and the receiver coil as a function of a position of the trigger wheel;
   wherein the circuit carrier is situated coaxially with the axis of rotation of the trigger wheel, the circuit carrier surrounding the trigger wheel at least partially in a circular manner.

2. The sensor device as recited in claim 1, wherein the sensor device is designed to ascertain an absolute position of the rotating element from the change in the inductive coupling.

3. The sensor device as recited in claim 1, wherein the circuit carrier has a flexible design.

4. The sensor device as recited in claim 1, wherein the circuit carrier has at least two planar areas, the planar areas being situated at an angle with respect to one another, the circuit carrier having at least one connection element which is designed to connect the planar areas to one another.

5. The sensor device as recited in claim 1, wherein the circuit carrier is situated in an injection-molded housing.

6. The sensor device as recited in claim 1, wherein the receiver coil has at least one sensor coil and the receiver coil is made up of two partial windings of a coil which are oriented in opposite directions.

7. The sensor device as recited in claim 1, wherein the trigger wheel profile has at least one profile element, the profile element being selected from the group made up of at least one tooth or one track contoured in a width of the trigger wheel.

8. The sensor device as recited in claim 1, wherein the trigger wheel has a multiplicity of profile elements which are distributed across a circumference of the trigger wheel.

9. The sensor device as recited in claim 1, wherein the sensor device has at least two trigger wheels.

10. The sensor device as recited in claim 1, wherein the sensor device includes an evaluation unit, the evaluation unit having at least one evaluation circuit which is situated together with the coil array on a shared circuit carrier or is situated separately from the coil array on a further circuit carrier.

11. The sensor device as recited in claim 1, wherein the sensor device is designed to provide an availability of an absolute positional value of the rotating element when a voltage supply is switched on.

12. A method for ascertaining at least one rotation characteristic of a rotating element using a sensor device, the sensor device having at least one trigger wheel which is able to be connected to the rotating element, the rotating element and the trigger wheel having an axis of rotation, the sensor device including at least one coil array and the coil array including at least one excitation coil and at least one receiver coil, the coil array being situated on at least one circuit carrier, and the trigger wheel having a trigger wheel profile, the method comprising:
   ascertaining a change in an inductive coupling between the excitation coil and the receiver coil as a function of a position of the trigger wheel;
   wherein the circuit carrier is situated coaxially with the axis of rotation of the trigger wheel, the circuit carrier surrounding the trigger wheel at least partially in a circular manner.

\* \* \* \* \*